United States Patent
Johnson, Jr. et al.

[19]

[11] Patent Number: 6,121,756
[45] Date of Patent: Sep. 19, 2000

[54] CHARGER

[75] Inventors: Robert William Johnson, Jr., Raleigh; Steven R. Widener, Wake Forest; Joseph C. Paulakonis, Chapel Hill, all of N.C.; Jeff Gucyski, Huntington Beach, Calif.

[73] Assignee: Powerware Corporation, Raleigh, N.C.

[21] Appl. No.: 09/426,347

[22] Filed: Oct. 25, 1999

Related U.S. Application Data

[63] Continuation of application No. 08/985,888, Nov. 25, 1997.

[51] Int. Cl.[7] ................................ H02J 7/06; H02J 7/24
[52] U.S. Cl. ................................................ 320/140
[58] Field of Search .................... 320/128, 137, 320/140, 143, 163, FOR 148, FOR 150, FOR 153, FOR 156; 363/24, 25, 131, 132, 133; 307/48, 66, 151

[56] References Cited

U.S. PATENT DOCUMENTS

| | | | |
|---|---|---|---|
| 4,639,849 | 1/1987 | Noworolski et al. | 363/56 |
| 4,641,232 | 2/1987 | Pitel | 363/71 |
| 4,706,177 | 11/1987 | Josephson | 363/24 |
| 4,935,861 | 6/1990 | Johnson, Jr. et al. | 363/132 |
| 5,291,383 | 3/1994 | Oughton | 363/17 |
| 5,302,858 | 4/1994 | Folts | 307/66 |
| 5,469,098 | 11/1995 | Johnson, Jr. | 327/190 |
| 5,555,494 | 9/1996 | Morris | 363/17 |
| 5,648,895 | 7/1997 | Chen | 363/131 |
| 5,790,391 | 8/1998 | Stich et al. | 363/24 |

FOREIGN PATENT DOCUMENTS 2543357   9/1984   France .

OTHER PUBLICATIONS

Muroyama S. et al., "A Control Method for a High Frequency Link Inverter Using Cycloconverter Techniques," Proceedings of the International Telecommunications Energy Conference (Intelec), Firenze, Oct. 15–18, 1989, vol. 2, No. Conf. 11, 15 Oct. 1989, pp. 19.1, 1–06, XP00012971, Institute of Electrical and Electronics Engineers.

Kazimierczuk, M.K. et al., "Topologies of Bidirectional PWM DC–DC Power Converters," Proceedings of the National Aerospace and Electronics Conference (NAECON), Dayton, May 24–28, 1993, vol. 1, 24 May 1993, pp. 435–441, XP000419442, Institute of Electrical and Electronics Engineers.

Rodriguez e., et al., "A Novel Integrated SMPS with Battery Backup and Power Factor Correction," Intelec. 18th International Telecommunications Energy Conference, Boston, Oct. 6–10, 1996, No. Conf. 18, 6 Oct. 1996, pp. 125–130, XP000699846, Institute of Electrical and Electronics Engineers.

*Primary Examiner*—Edward H. Tso
*Attorney, Agent, or Firm*—Myers Bigel Sibley & Sajovec

[57] ABSTRACT

An uninterruptible power supply (UPS) comprises a low voltage converter (02); a coupled inductor (60) comprising a first inductor (63) coupled to the battery, a second inductor (61) coupled to a first output terminal of a rectifier, and a third inductor (62) coupled to a second output terminal of the rectifier; a snubber circuit; and a high voltage inverter (01).

48 Claims, 3 Drawing Sheets

Voltage Waveforms at 70 and 72 with Current Waveforms in Q1 and Q2

Battery Converter Operation

Current Waveforms in Q1 and D2 during battery converter "dead time"

CHARGER

CROSS REFERENCE TO RELATED APPLICATION

This is a con of Ser. No. 08/985,888 filed Nov. 25, 1997.

The present invention is related by subject matter to co-pending application Ser. No. 08/988,335, filed on even date herewith, titled "Frequency Converter and Improved UPS Employing the Same", which is hereby incorporated by reference.

FIELD OF THE INVENTION

The present invention relates generally to an improved uninterruptible power supply (UPS) comprising a novel battery charger and a snubber circuit.

BACKGROUND OF THE INVENTION

An uninterruptible power supply is used to provide electrical power to a load during an "emergency" situation in which the main utility power is not available, e.g., because of a line fault. UPS topologies are well known. They typically employ 60 Hz voltage transformers and require bulk storage. A goal of the present invention is to eliminate the need for such 60 Hz transformers and bulk storage because of the physical size and cost of these components. A further goal of the present invention is to provide a UPS topology in which the main switching elements are connected to neutral because such referenced switches are easily controlled with the signals without employing transformers or other isolation means. Additionally, there is a need for only a single power supply for the gate drive circuits to thereby reduce complexity and cost. In addition, a goal of the present invention is to provide an improved UPS topology with a minimum parts count.

SUMMARY OF THE INVENTION

An uninterruptible power supply (UPS) in accordance with a presently preferred embodiment of the invention comprises a transformer; a low voltage converter (02) comprising a battery providing a DC voltage, a first switching device (Q3), a second switching device (Q4), and first drive means (41, 42) for driving the switching devices from a conducting state to a non-conducting state and vice versa; a rectifier for converting a first AC voltage across the secondary winding to a first high DC voltage (V, where "V" is the desired output voltage) at the first output terminal and a second high DC voltage (-V) at the second output terminal; a coupled inductor comprising a first winding (63) operatively coupled to the battery through a diode (D2), a second winding (61) operatively coupled to the first output terminal of the rectifier, and a third winding (62) operatively coupled to the second output terminal of the rectifier; a snubber circuit; and a high voltage inverter (01) for generating an output voltage waveform.

In the presently preferred embodiment of the invention, the snubber circuit comprises a capacitor (C3) in series with a parallel combination of a resistor (R3) and a diode (D1). The first drive means alternately drives the first and second switching devices from the conducting state to the non-conducting state at a frequency in the range of between 10 times the fundamental and approximately 100 kHz, and preferably at a frequency of approximately 20 kHz. (The important thing is that the higher frequency enables one to reduce the transformer size.) Moreover, the output voltage waveform is quasi-square and is characterized by a frequency of approximately 60 Hz, and the battery voltage is approximately 12 Volts DC while the output voltage varies between +160 and -160 Volts.

Other features of the present invention are disclosed below.

DETAILED DESCRIPTION OF PREFERRED EMBODIMENTS

Figure 1:
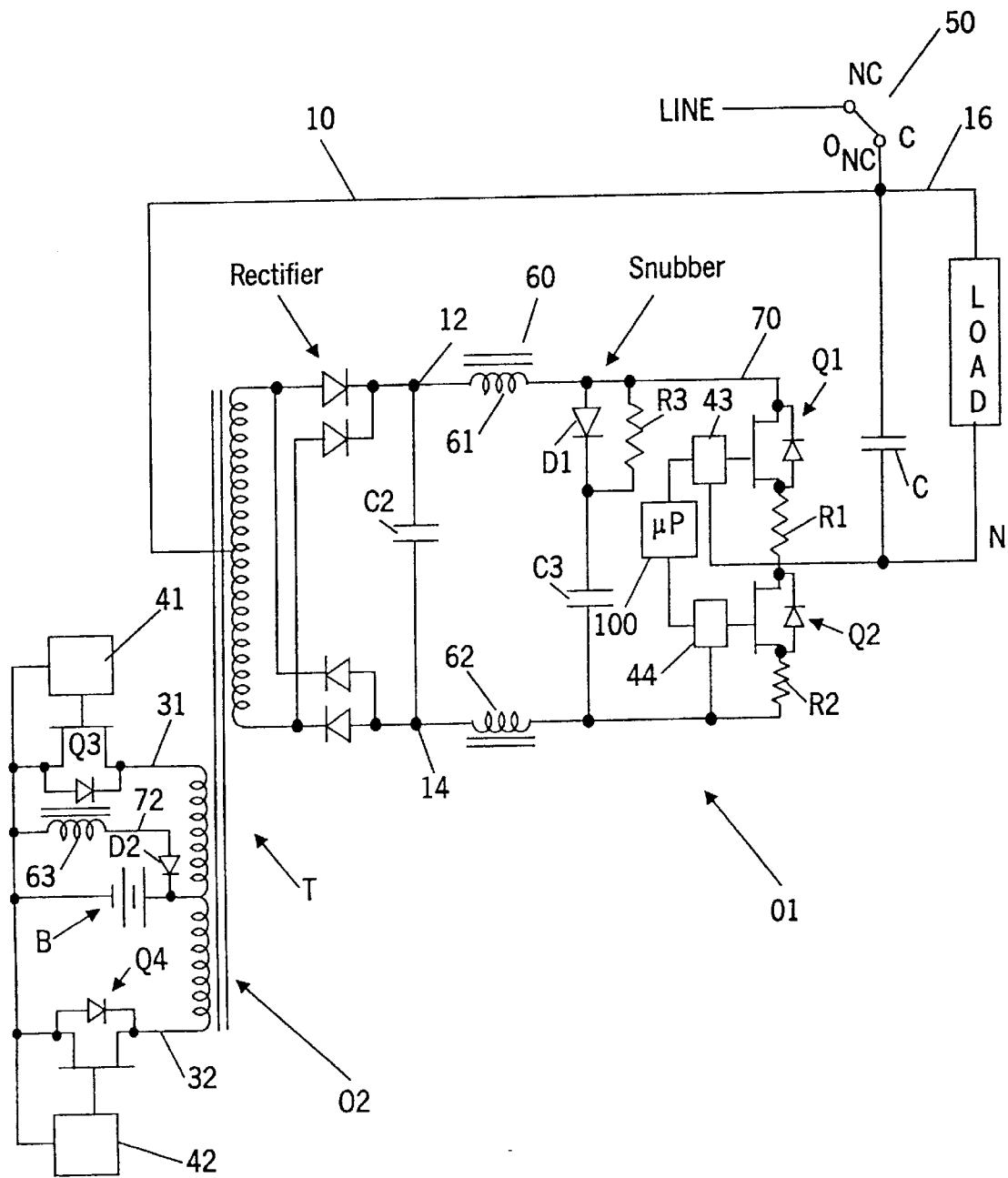
FIG. 1 schematically depicts an improved UPS topology including a charger and snubber in accordance with the present invention.

The charger and snubber circuitry of the present invention is described herein as implemented in the UPS topology described in the above-cited co-pending application Ser. No. 08/988,335, "Frequency Converter and Improved UPS Employing the Same" (attorney docket EXEL-0366). FIG. 1 is a circuit diagram of the modified circuit. There are two modes of operation that are described in detail below. The first mode is as a charger and the second mode is as a snubber. The elements added to the UPS topology disclosed in the above-cited co-pending application are capacitors C2 and C3, diodes D1 and D2, resistor R3, and inductor 60 with coupled windings 61, 62 and 63 (i.e., windings 61, 62 and 63 are wound around a common core). The snubber circuit comprises diode D1, resistor R3 and capacitor C3. The charger circuit comprises the inductor 60 with coupled windings 61, 62 and 63, and diode D2. (The diodes across transistors Q1 and Q2 allow inductive currents to flow in the reverse direction. Such anti-parallel diodes are well known.)

The UPS topology will be generally described next, and then the charger and snubber operations will be described in detail.

UPS Topology

The UPS topology of the present invention departs from previous designs in a number of ways. First, the transformer (T) is not directly connected to a "stiff" voltage source, as shown in FIG. 1. The circuit is composed of three main parts in addition to the charger and snubber. The first part of is the high voltage output section, also called a high voltage inverter, and comprises transistors Q1, Q2; resistors R1, R2; and gate drive circuitry 43, 44 controlled by a microprocessor 100. The gate drive circuitry 43, 44 in the presently preferred embodiment of the invention is composed of discrete components connected to the microprocessor. (Such gate drive circuitry is well known in the art, and so it will not be described in detail in this specification.) The second part 02 is the low voltage battery converter section, and it comprises a battery (B) (e.g., a 12 V battery); a pair of transistors Q3, Q4; and corresponding gate drive circuits 41, 42 (e.g., Unitrode UCC 3806 IC). The battery converter section 02 is coupled to the high voltage inverter section 01 by the transformer and a bridge rectifier, as shown. The third part 50 is the transfer means to switch between normal and emergency operation. During normal operation, the load is connected to a utility line and during emergency operation the load is connected to the UPS. The manner in which the transfer means detects an emergency (lack of line power)

and switches the load to the UPS is well known and will not be described herein.

Figure 3:
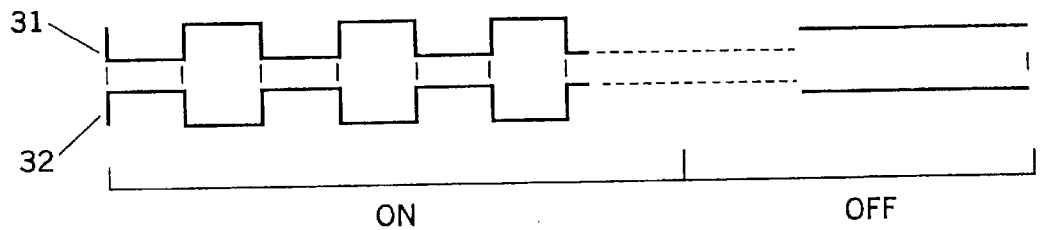
FIG. 3 depicts voltage waveforms on nodes 31 and 32 of the battery converter section of the UPS.

The battery converter 01 is modulated at a first frequency that is low similar to the line frequency. The modulation causes the battery converter to operate for some fraction of the period and then disables the battery converter for the rest of the cycle, as shown in FIG. 3. To produce a 60 Hz output waveform across the load, this modulation would be at a rate of 120 Hz. When the battery converter is operating, the transistors Q3 and Q4 operate in a push-pull configuration with a duty cycle of 50% during the ON portion. This second frequency is substantially higher than the line frequency. A typical operating frequency would be between 15 kHz and 100 kHz, and preferably 20 kHz. When the battery converter is operating, the transformer's secondary winding and rectifier will produce a DC voltage between nodes 12 and 14. This DC voltage is twice the desired output voltage "V". For example, the voltage differential between nodes 12 and 14 may be 320 Volts DC (where the desired output voltage is 160 Volts).

In the high voltage output section 01, transistors Q1 and Q2 alternately conduct to apply the DC voltage to the load. When Q1 conducts, the positive DC voltage terminal 12 is connected to neutral through resistor R1. The center tap of the high voltage winding is now at −V. This negative voltage is applied to the load node 16 for the duration of the ON period of the battery converter's operation. When the battery converter is disabled, the voltage −V is actively removed from the load by simultaneous conduction of Q1 and Q2. This effectively shorts out the load and produces a low impedance zero. This is necessary for inductive loads to prevent the load voltage at node 16 from uncontrolled variations. Just before the battery converter is to resume operation, the transistor Q1 is switched to a non-conductive state. When the battery converter operates this time, the negative voltage at node 14 is connected to neutral and the voltage at the center tap of the high voltage winding is at +V potential. As discussed above, this voltage is applied to the load for the duration of the battery converter operation. Again, when the battery converter is disabled, the voltage +V is actively removed to produce a low impedance zero voltage. This sequence of events repeats at the first frequency and therefore produces a quasi-square wave voltage of amplitude V across the load. The voltages described are shown in FIG. 3.

The resistors R1 and R2 offer current protection to the transistors Q1 and Q2. During the low impedance zero and the charging of the output capacitor C, currents can flow that could damage the transistors. The resistors R1 and R2 inserted in the source connections of Q1 and Q2 will reduce the gate voltage just before damaging currents flow. The reduced gate voltage will cause the transistor to operate in the linear region, resulting in limited current in the transistors.

When line voltage is sufficient to power the load directly, the battery converter section and the high voltage output section stop operation and the utility is connected directly to the load by the transfer means 50.

Figure 2:
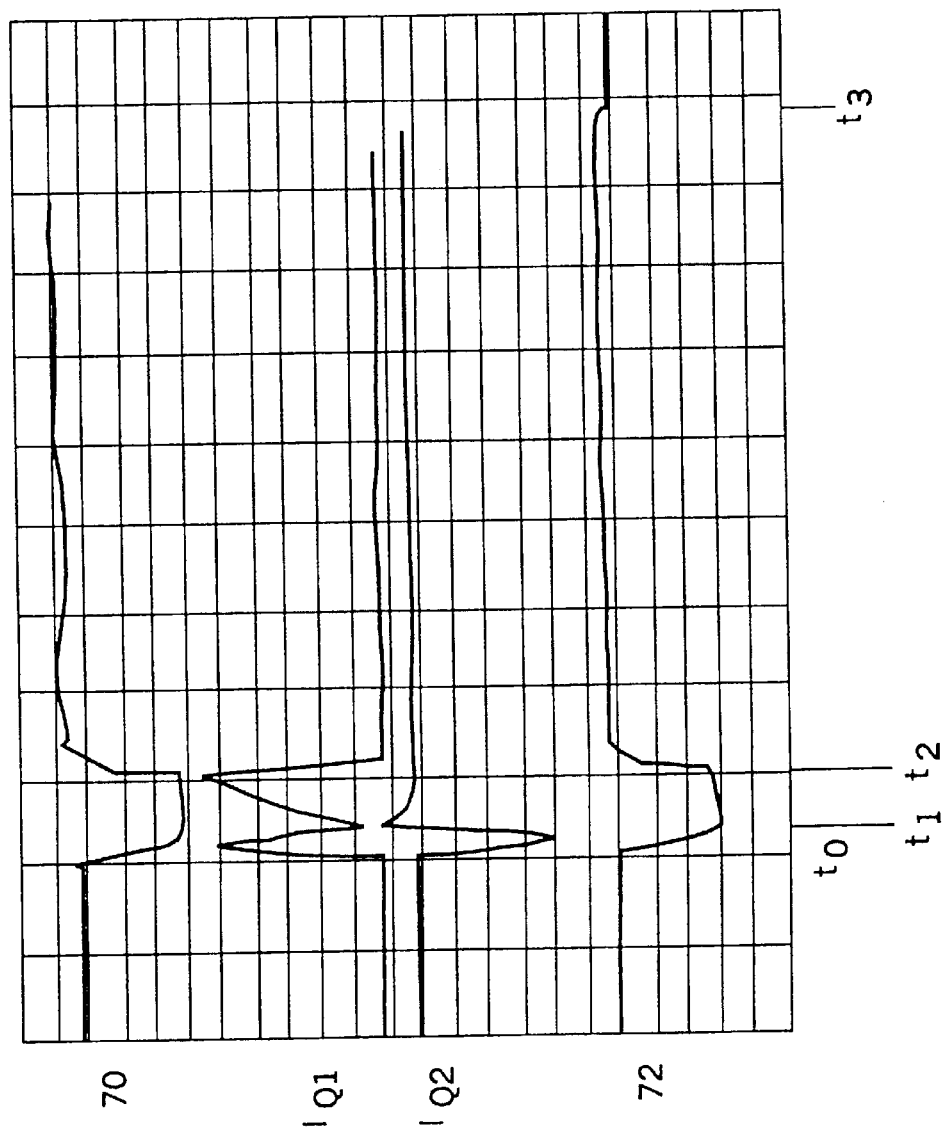
FIG. 2 depicts voltage waveforms on nodes 70 and 72 and current waveforms in Q1 and Q2 of the UPS.

Charger Operation (Refer to FIGS. 1 and 2)

During normal operation, the line voltage is applied through the transfer means 50 to the load. Transistors Q3 and Q4 are OFF. During the positive portion of the line voltage, Q1 is turned ON. The line voltage is applied across winding 61 of inductor 60. At the same time, a voltage, equal to the voltage applied across winding 61, appears across winding 62 of inductor 60. This causes a current to flow through both transistors Q1 and Q2 to charge capacitor C2. After capacitor C2 is charged, current starts to increase in winding 61 of inductor 60. During this period of increasing current, the diode D2 is reverse biased. The current will increase until the desired peak current is reached. At this desired current, the transistor Q1 is switched OFF. When the transistor is switched OFF, the voltage across the inductor reverses, causing the winding 63 of inductor 60 to forward bias diode D2. This allows the stored energy to be recovered by coupling it into the battery. Once the inductor current reaches a minimum current, the transistor Q1 turns on again and the cycle repeats as long as the line voltage is positive. When the line voltage is negative, the charger action can continue by using transistor Q2 to increase the current in winding 62 of inductor 60. Again, once the desired peak current is reached, the transistor Q2 is turned OFF and the winding 63 of inductor 60 conducts current through the diode D2 to recover the stored inductor energy. It should be noted that the high frequency transformer becomes saturated after repeated transistor conduction since there is no means to reset the core. This effectively removes this transformer from the circuit, essentially connecting the inductor 60 directly to the utility.

As shown in FIG. 2, switching device Q1 turns on at $t_0$ with line voltage at node 12. Line voltage is applied across winding 61 of inductor 60. Current appears in Q2 as C2 is charged through mutually coupled winding 62 of inductor 60. After C2 has charged ($t_1$) we see current increase in winding 61 until Q1 turns off at $t_2$. The stored energy in inductor 60 is released through winding 63 and diode D2 into the battery.

Snubber Operation

Figure 4:
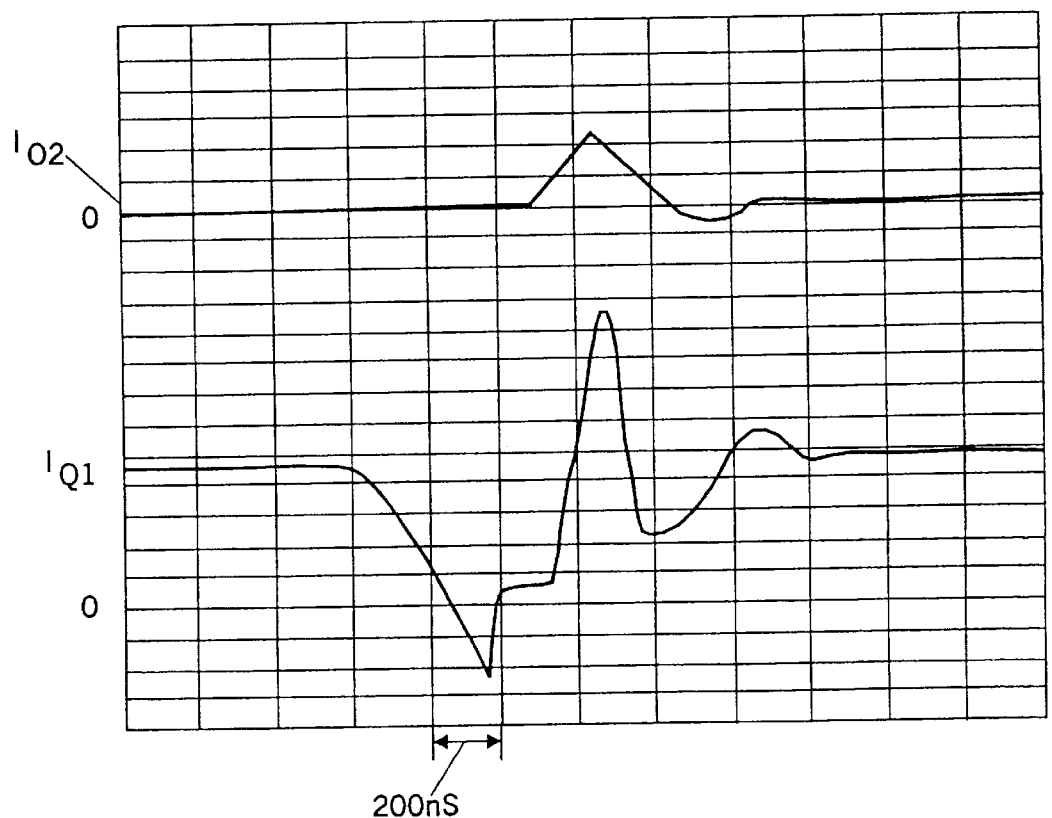
FIG. 4 depicts current waveforms in Q1 and D2 during battery "dead time."

As mentioned, in an emergency the line is removed from the load by the transfer means 50 and the battery converter 02 starts operation. When the battery converter is operating, there is some uncoupled leakage inductance of transformer that will store energy. This energy must be dissipated or recovered or it will tend to cause the voltage on capacitor C to increase to unacceptable levels, especially at light loads. The introduction of inductor 60 in the circuit will recover a substantial portion of the energy stored in the leakage inductance. To cause this circuit to recover the energy, capacitor C3 should be much larger than capacitor C2, C2 should be selected to resonate with the leakage inductance, and the frequency should be selected so that the energy is recovered in the dead-time when transistors Q3 and Q4 are not conducting. During the conduction of Q3, energy is stored in the leakage inductance of the high frequency transformer (T). When transistor Q3 turns OFF, there is a small delay before Q4 is turned on. During this time the current will flow into capacitor C2, increasing the voltage across the winding 61 of inductor 60. As discussed above, the current will build in the winding 61 of inductor 60 with the positive voltage applied across the winding 61. The leakage in the transformer will transfer to the inductor 60. When the voltage starts to fall, less positive on winding 61 of inductor 60, the winding 63 for inductor 60 will forward-bias diode D2 and the energy will be returned to the battery. This cycle of charge and discharge is repeated for the positive half cycle of the output voltage when the battery converter is operating. A similar cycle occurs during the negative half cycle of the output voltage using winding 62 instead of winding 61. FIG. 4 illustrates this snubber action in terms of current waveforms in Q1 and D2 during the battery converter "dead time". The actual waveform has current ringing that is not shown in the drawing.

The present invention, and thus the scope of protection of the following claims, is not limited to the specific, presently preferred embodiment described above. For example:

(1) The negative of the battery is connected to line neutral so we can minimize the number of power supplies required. It is possible to connect the battery to ground and provide isolated battery controls. It is also possible to connect one terminal of the battery to the neutral to gain reduced complexity of control (preferred embodiment).

(2) For the transistor above we used a MOSFET that has an internal anti-parallel diode. Other devices can be used, such as IGBTs with anti-parallel diodes.

(3) Instead of a push-pull battery converter described in the specification, one can use a bridge converter characterized by 4 switching elements and single primary winding instead of the center-tapped winding described.

(4) The output could be modulated and filtered to produce a sinewave output waveshape.

(5) Battery charging in either the positive, negative or both positions of the line voltage waveform is possible.

(6) Transformers with a plurality of secondary windings can be employed to produce high voltages at more than one phase.

We claim:

1. An uninterruptible power supply (UPS), comprising:
   (a) a transformer having a primary winding and a secondary winding;
   (b) a low voltage converter (02) comprising a battery providing a DC voltage operatively coupled to a primary winding of said transformer, whereby a first AC voltage differential is generated across the secondary winding of said transformer;
   (c) a high voltage inverter (01) comprising first and second load terminals adapted to be coupled across a load in an emergency situation; a transistor Q1 and another transistor Q2, wherein said transistors Q1 and Q2 are switchable from conducting to non-conducting states and vice versa so as to produce an output voltage waveform across said load terminals when a load is coupled thereto, said output voltage being characterized by an amplitude that varies between a positive peak (V) and a negative peak (−V); and
   (d) coupled inductor means (60) comprising a first winding (63) operatively coupled to said battery, and at least a second winding (61, 62) operatively coupled to said high voltage inverter, wherein said first and second windings are wound around a common core.

2. An uninterruptible power supply as recited in claim 1, further comprising a snubber circuit operatively coupled to said second and third inductors.

3. An uninterruptible power supply as recited in claim 1, wherein a transistor Q3, another transistor Q4, and first drive means (41, 42) for driving said transistors Q3 and Q4 from a conducting state to a non-conducting state and vice versa; wherein Q3 is operatively coupled to a first terminal of said primary winding of said transformer, Q4 is operatively coupled to a second terminal of said primary winding, and said battery is operatively coupled to a third terminal of said primary winding.

4. An uninterruptible power supply as recited in claim 1, further comprising a rectifier, having first and second output terminals (12, 14), for converting said first AC voltage across the secondary winding to a first high DC voltage (V) at said first output terminal and a second high DC voltage (−V) at said second output terminal.

5. An uninterruptible power supply as recited in claim 1, further comprising an output capacitor (C) operatively coupled to said load terminals.

6. An uninterruptible power supply as recited in claim 1, wherein said output voltage is characterized by a quasi-square waveform.

7. An uninterruptible power supply as recited in claim 1, wherein said transistors Q3 and Q4 are alternately driven from said conducting state to said non-conducting state at a frequency of approximately 20 kHz; wherein said output voltage is characterized by a quasi-square waveform with a frequency of approximately 60 Hz; and wherein the battery voltage is approximately 12 Volts DC and the quasi-square output voltage varies between +160 Volts and −160 Volts.

8. An uninterruptible power supply (UPS), comprising:
   (a) a transformer having a primary winding and a secondary winding;
   (b) a low voltage converter (02) comprising a battery providing a DC voltage, a first switching device (Q3), a second switching device (Q4), and first drive means (41, 42) for driving said switching devices from a conducting state to a non-conducting state and vice versa;
   wherein said first switching device is operatively coupled to a first terminal of said primary winding of said transformer, said second switching device is operatively coupled to a second terminal of said primary winding, and said battery is operatively coupled to a third terminal of said primary winding, whereby a first AC voltage differential is generated across the secondary winding of said transformer;
   (c) a rectifier, having first and second output terminals (12, 14), for converting said first AC voltage across the secondary winding to a first high DC voltage (V) at said first output terminal and a second high DC voltage (−V) at said second output terminal;
   (d) coupled inductor means (60) comprising a first winding (63) operatively coupled to said battery, a second winding (61) operatively coupled to said first output terminal of said rectifier, and a third winding (62) operatively coupled to said second output terminal of said rectifier, wherein said first, second and third windings are wound around a common core;
   (e) a snubber circuit operatively coupled to said second and third inductors; and
   (f) a high voltage inverter (01) comprising first and second load terminals adapted to be coupled across a load in an emergency situation; a third switching device (Q1) and a fourth switching device (Q2), and second drive means (43, 44) for driving said third and fourth switching devices from conducting to non-conducting states, and vice versa, so as to produce a quasi-square output voltage waveform across said load terminals when a load is coupled thereto, said output voltage being characterized by an amplitude that varies between a positive peak (V) and a negative peak (−V).

9. An uninterruptible power supply as recited in claim 8, wherein said snubber circuit comprises a capacitor (C3) in series with a parallel combination of a resistor (R3) and a diode (D1).

10. An uninterruptible power supply as recited in claim 8, wherein said first drive means alternately drives said first and second switching devices from said conducting state to said non-conducting state at an operating frequency in the range of between 10 times the fundamental frequency to about 100 kHz.

11. An uninterruptible power supply as recited in claim 10, wherein said operating frequency is approximately 20 kHz.

12. An uninterruptible power supply as recited in claim 8, wherein the quasi-square output voltage waveform is characterized by a frequency of approximately 50–60 Hz.

13. An uninterruptible power supply as recited in claim 8, wherein each of said first, second, third and fourth switching devices comprises a transistor.

14. An uninterruptible power supply as recited in claim 8, wherein the battery voltage is approximately 12 Volts DC and the quasi-square output voltage varies between +160 Volts and −160 Volts.

15. An uninterruptible power supply as recited in claim 8, wherein said first drive means alternately drives said first and second switching devices from said conducting state to said non-conducting state at a frequency of approximately 20 kHz; wherein the quasi-square output voltage waveform is characterized by a frequency of approximately 60 Hz; wherein each of said first, second, third and fourth switching devices comprises a transistor; and wherein the battery voltage is approximately 12 Volts DC and the quasi-square output voltage varies between +160 Volts and −160 Volts.

16. An uninterruptible power supply as recited in claim 8, further comprising a diode connected between said first inductor and a positive terminal of said battery.

17. An uninterruptible power supply as recited in claim 8, further comprising a diode coupled in with each of said third and fourth switching devices (Q1, Q2).

18. An uninterruptible power supply as recited in claim 15, wherein said snubber circuit comprises a capacitor (C3) is series with a parallel combination of a resistor (R3) and a diode (D1); further comprising a diode connected between said first inductor and a positive terminal of said battery; and further comprising a diode coupled in anti-parallel with each of said third and fourth switching devices (Q1, Q2).

19. An uninterruptible power supply (UPS) for generating an AC voltage across a load, the UPS comprising:
a transformer having a primary winding and a secondary winding;
an inverter circuit, configured to connect to a DC power source, coupled to said primary winding, and operative to couple the DC power source to said primary winding and thereby generate an AC voltage on said secondary winding from the DC power source in a first mode and to decouple the DC power source from said primary winding in a second mode; and
a converter/charger circuit coupled to said secondary winding, configured to connect to an AC power source, said converter/charger circuit including a first inductor coupled to said secondary winding and a second inductor inductively coupled to the first inductor and configured to connect to the DC power source, said converter/charger circuit operative to produce the AC output voltage from the AC voltage generated by said inverter circuit in the first mode, to produce the AC output voltage from the AC power source in a second mode, and to couple said secondary winding to the first inductor in at least one of said first and second modes such that energy is transferred from said secondary winding to the DC power source through the first and second coupled inductors.

20. A UPS according to claim 19, wherein said converter/charger circuit comprises:
a rectifier connected to said secondary winding of said transformer; and
a switching circuit that selectively couples the rectifier to the load through the first inductor.

21. A UPS according to claim 20, wherein said first and second inductors comprise respective ones of a pair of windings inductively coupled through a common core.

22. A UPS according to claim 20:
wherein said first inductor comprises a first winding coupled to said secondary winding of said transformer;
wherein said second inductor comprises a second winding connected in series combination with a diode, said series combination of the diode and said first one of the pair of windings configured to connect across the DC power source; and
wherein said first and second windings are inductively coupled through a common core.

23. A UPS according to claim 20:
wherein said rectifier has a first output terminal and a second output terminal;
wherein said switching circuit has a first input terminal and a second input terminal;
wherein said first inductor comprises:
a first winding coupling said first output terminal of said rectifier to said first input terminal of said switching circuit; and
a second winding coupling said second output terminal of said rectifier to said second input terminal of said switching circuit; and
wherein said second inductor comprises a third winding inductively coupled to said first and second windings and configured to connect to the DC power source.

24. A UPS according to claim 23 wherein said first, second and third windings are inductively coupled through a common core.

25. A UPS according to claim 20, wherein said switching circuit is operative to alternately connect said first and second output terminals of the rectifier to the load in the first mode to generate the AC output voltage.

26. A UPS according to claim 25:
wherein said secondary winding of said transformer has a center terminal configured to connect to a first terminal of the load; and
wherein said switching circuit is operative to alternately connect said first and second output terminals of the rectifier to a second terminal of the load in the first mode to generate the AC output voltage.

27. A power supply according to claim 20, wherein said converter/charger circuit further comprises a transfer switch that connects the AC power source to said secondary winding in the second mode, and wherein said switching circuit is operative to selectively connect said secondary winding to the load in the second mode to transfer energy from the AC power source to the DC power source through the coupled first and second inductors.

28. A UPS according to claim 27:
wherein said secondary winding has a center terminal configured to connect to a first terminal of the load;
wherein said transfer switch connects the first terminal of the load and said center terminal of said secondary winding to the AC power source in the second mode; and
wherein said switching circuit is operative to selectively connect said first and second output terminals of said rectifier to a second terminal of the load in the second mode to transfer energy from the AC power source to the DC power source through the coupled first and second inductors.

29. A UPS according to claim 19, further comprising a battery connected to said inverter circuit.

30. A power supply comprising:
a transformer having a primary winding and a secondary winding configured to connect to a first terminal of a load;

a first inverter circuit, coupled to said primary winding and configured to connect to a battery, that applies a DC voltage generated by the battery to said primary winding in alternating polarity to produce a first AC voltage on said secondary winding;

a rectifier circuit, coupled to said secondary winding, that rectifies the first AC voltage to produce first and second rectified DC voltages at respective first and second output terminals thereof; and a second inverter circuit, coupled to said rectifier circuit and configured to connect to a second terminal of the load, that alternately couples said first and second output terminals of said rectifier circuit to the second terminal of the load at a first frequency to produce a second AC voltage across the load, wherein said first inverter circuit decouples said primary winding from the DC power source when said second inverter circuit switches connections between the second terminal of the load and said first and second output terminals of said rectifier; and a charging circuit configured to connect to the battery and operative to provide a charging current thereto.

31. A power supply according to claim 30, wherein said charging circuit is coupled to said secondary winding of said transformer and operative to transfer energy from said secondary winding to said battery.

32. A power supply according to claim 31, wherein said charging circuit is operative to inductively transfer energy to the battery.

33. A power supply according to claim 32 wherein said charging circuit comprises:

a first inductor coupled in series with said rectifier circuit and said second inverter circuit; and a second inductor inductively coupled with said first inductor and configured to connect to the battery.

34. A power supply according to claim 30:

wherein said primary winding has first and second end terminals and a center terminal, said center terminal of said primary winding configured to connect to a first terminal of the battery; and wherein said first inverter circuit alternately couples said first and second end terminals of said primary winding to a second terminal of the battery at a second frequency greater than said first frequency.

35. A power supply according to claim 34, wherein said second inverter circuit couples both of said first and second output terminals of said rectifier circuit to the second terminal of the load during when said first inverter decouples both of said first and second end terminals of said primary winding from the battery.

36. A power supply according to claim 35, wherein said second inverter circuit couples both of said first and second output terminals of said rectifier circuit to the second terminal of the load and then decouples one of said first and second output terminals of said rectifier circuit from the second terminal of the load before said first inverter circuit connects one of said first and second end terminals of said primary winding to the second terminal of the battery.

37. A power supply according to claim 34, wherein said second frequency is less than 100 kHz.

38. A power supply according to claim 37, wherein said second AC voltage has a fundamental frequency approximately one-half of said first frequency.

39. A power supply according to claim 38, wherein said fundamental frequency of the second AC voltage is approximately 60 Hz, and wherein said second frequency is in a range from ten times said fundamental frequency to 100 kHz.

40. A power supply according to claim 34, wherein said first inverter circuit comprises:

a first switch operative to couple and decouple the first terminal of the battery and said first end terminal of said primary winding; and a second switch operative to couple and decouple the first terminal of the battery and said second end terminal of said primary winding.

41. A power supply according to claim 40, wherein said first and second switches comprise respective first and second transistors.

42. A power supply according to claim 34, wherein said second inverter circuit comprises:

a first switch operative to couple and decouple said first output terminal of said rectifier and the second terminal of the load; and a second switch operative to couple and decouple said second output terminal of said rectifier and the second terminal of the load.

43. A power supply according to claim 42, wherein said first and second switches comprise respective first and second transistors.

44. A power supply according to claim 30, further comprising a switch operative to couple and decouple the center terminal of secondary winding and an AC power source.

45. A power supply according to claim 44, wherein said charging circuit and said second inverter circuit cooperatively transfer energy from the AC power source to the battery when said switch couples the AC power source to the center terminal of the secondary winding.

46. A method of generating an AC voltage across a load from a DC voltage produced by a DC power source, the method comprising the steps of:

applying the DC voltage to first end terminal of a primary winding of a transformer in alternating polarity to generate a first AC voltage on a secondary winding of the transformer, the secondary winding having a center terminal connected to a first terminal of the load;

applying the first AC voltage to a rectifier to produce first and second rectified DC voltages at first and second output terminals of the rectifier;

alternately coupling the first and second output terminals of the rectifier to a second terminal of the load at a first frequency to produce a second AC voltage across the load; and decoupling said primary winding from the DC power source when switching the second terminal of the load between the first and second output terminals of the rectifier.

47. A method according to claim 46, further comprising the step of concurrently coupling the first and second output terminals of the rectifier to the second terminal of the load when the primary winding is decoupled from the DC power source.

48. A method according to claim 46, further comprising the step of inductively transferring energy generated at the first and second output terminals of the rectifier to the DC power source.

* * * * *